United States Patent [19]
Keene

[11] Patent Number: 5,400,969
[45] Date of Patent: Mar. 28, 1995

[54] LIQUID VAPORIZER AND DIFFUSER

[76] Inventor: Christopher M. Keene, 32 Grosvenor Rd., Waltham, Mass. 02154

[21] Appl. No.: 122,945

[22] Filed: Sep. 20, 1993

[51] Int. Cl.⁶ .............................. B05B 1/24; B60L 1/02
[52] U.S. Cl. .................................. 239/136; 239/135; 392/398; 392/485; 219/205
[58] Field of Search ................ 239/135, 136; 219/205, 219/206, 207; 392/485, 394, 396, 397, 398; 123/298, 543, 547, 548, 549

[56] References Cited

U.S. PATENT DOCUMENTS

| | | | |
|---|---|---|---|
| 2,700,722 | 1/1955 | Gurley | 219/38 |
| 3,915,137 | 10/1975 | Evans | 123/122 F |
| 3,995,143 | 11/1976 | Hervert | 219/205 X |
| 4,019,021 | 4/1977 | Schladitz | 392/485 |
| 4,020,812 | 5/1977 | Hayward | 123/122 F |
| 4,037,352 | 7/1977 | Hennart et al. | 239/136 X |
| 4,106,454 | 8/1978 | Henlis | 123/122 F |
| 4,108,125 | 8/1978 | Marcoux et al. | 219/206 X |
| 4,108,953 | 8/1978 | Rocco | 261/142 |
| 4,212,275 | 7/1980 | Inoue | 123/549 |
| 4,269,793 | 5/1981 | Ibbott | 261/65 |
| 4,286,564 | 9/1981 | Vantuyl | 123/545 |
| 4,303,050 | 12/1981 | Platzer, Jr. | 123/548 X |
| 4,336,784 | 6/1982 | Gotoh | 123/571 |
| 4,356,804 | 11/1982 | Igashira | 123/549 |
| 4,362,142 | 12/1992 | Igashira et al. | 123/549 |
| 4,387,690 | 6/1983 | Chiavaroli | 123/549 |
| 4,398,522 | 8/1983 | Kuroiwa | 123/549 |
| 4,458,654 | 7/1984 | Tuckey | 123/557 |
| 4,528,967 | 7/1985 | Bart | 123/549 |
| 4,603,667 | 8/1986 | Grünwald | 123/297 |
| 4,627,405 | 12/1986 | Imhof | 123/549 |
| 4,651,702 | 3/1987 | Nara | 123/549 |
| 4,760,818 | 8/1988 | Brooks | 123/298 |
| 4,834,043 | 5/1989 | Kaczynski | 123/297 |
| 5,038,742 | 8/1991 | Uddin | 123/549 |
| 5,117,482 | 5/1992 | Hauber | 392/485 |
| 5,175,996 | 1/1993 | Smith | 392/396 X |
| 5,271,087 | 12/1993 | Schmid | 239/135 |

FOREIGN PATENT DOCUMENTS

| | | | |
|---|---|---|---|
| 3538282 | 4/1987 | Germany | 219/205 |
| 528943 | 6/1975 | U.S.S.R. | 239/135 |

Primary Examiner—Andres Kashnikow
Assistant Examiner—Lesley D. Morris
Attorney, Agent, or Firm—Christopher P. Ricci

[57] ABSTRACT

Apparatus for vaporizing liquids to be burned in an internal combustion engine or furnace for the purpose of increasing fuel efficiency, improving cold weather starting and reducing pollution. The device may also be used in non combustion processes such as heating coating or disbursing. A three dimensionally porous electric heating element constructed of a PTC ceramic is utilized in combination with a liquid injection apparatus for the purpose of vaporizing liquid injected into it. The PTC ceramic is resistantly heated by electrical power leads a temperature at which the injected liquid vaporizes and diffuses through its pores. The porous PTC ceramic is designed to auto-stabilize its temperature at a point for the optimum vaporization of the desired liquid.

25 Claims, 8 Drawing Sheets

LIQUID VAPORIZER AND DIFFUSER

BACKGROUND OF THE INVENTION

1. Field of the Invention

This invention relates primarily to fuel injection devices and more specifically to a new and improved means of transforming atomized liquid fuel to a gaseous or vaporized state for more efficient combustion in an internal combustion engine or furnace. The same device can also be put to use in many other processes other than combustion, such as disbursing and fogging, or any application that requires the transformation of a liquid to a gas efficiently at a specific point in a process.

2. Background of the Invention

Through my research in the field of carburetion and fuel injection systems incorporating fuel heating or vaporizing devices of which the instant invention shares a common purpose, it has become apparent that there are four general approaches by which the heating of liquid fuel to a vaporized or gaseous state is being accomplished.

The first approach involves the recycling of exhaust gases to a heat exchanger in the carburetor for the purpose of fuel vaporization, an example of which is U.S. Pat. No. 4,336,784 to Gotoh, Otobe, Kawamoto, and Fujimura issued on Jun. 29, 1982. The disadvantage to this arrangement is that vaporized fuel is not available until after the engine has started so that the device is of no help in starting engines at low ambient temperatures.

The second approach involves the circulating of heated engine cooling water through a heat exchanger in or under the carburetor for the purpose of fuel vaporization, an example of which is U.S. Pat. No. 4,286,564 issued to Van Tuyl on Sep. 1, 1981. This approach suffers from the same deficiency as in Gotoh (U.S. Pat. No. 4,336,784) cited above.

The third approach involves the use of electrical heating devices located in the carburetor or between the carburetor and intake manifold for the purpose of vaporizing fuel.

The following are examples of electrical heating devices located between a carburetor or throttle body and the intake manifold of an internal combustion engine. U.S. Pat. No. 4,108,953 issued to Rocco on Aug. 22, 1978, U.S. Pat. No. 4,106,454 issued to Jasper and Ball on Aug. 15, 1978, U.S. Pat. No. 4,020,812 issued to Hayward on May 3, 1977, and U.S. Pat. No. 2,700,722 issued to Keuhl on Jan. 25, 1955. All of the claimed devices of the aforementioned art employ heat conducting screens that are in contact with electrical resistance heaters. This configuration is not an efficient heat exchanger. Another disadvantage to this approach is that inlet air is restricted. A third problem with this approach is that in order to vaporize a relatively small volume of liquid or atomized fuel, a tremendous volume of air must also be heated making this an impractical fuel vaporization means.

U.S. Pat. No. 4,528,967 issued to Bart on Jul. 16, 1985, sets forth a throttle body fuel system which employs an electrically heated annular venturi section. The heated venturi is comprised of a metal tubular component in contact with a resistance heating element segregated from the main throttle body by means of a thermal insulator. The tubular metal component has a series of holes straight through its wall intended to vaporize fuel as it passes through the component into the throat of the venturi. A disadvantage of this arrangement is the inefficiency of the tubular member employing holes straight through its wall as a heat exchanger. Another drawback is that an engine backfire could flash back through the series of holes provided in the tubular component for the purpose of fuel passage, thereby enabling flame to burn in the annular void surrounding the heated venturi. The drawings for the preferred embodiment of this throttle body show two diametrically opposed nozzles as the atomized fuel source. With this arrangement it would be difficult to distribute fuel evenly around the outside circumference of the fuel heating element.

U.S. Pat. No. 3,915,137 issued to Evans on Oct. 28, 1975 sets forth a heating coil that is located beneath the fuel jet in a venturi associated with a carburetor. The inefficiency of the heat exchanger design, and the fact that the heater is located in the center of the inlet air stream whereby a large volume of air passing by the element would have to be heated in addition to the relatively small volume of liquid fuel makes this device impractical for a fuel vaporizer. U.S. Pat. No. 4,458,654 issued to Tuckey on Jul. 10, 1984 suffers from the same short-coming as does the previous example.

A number of fuel heating devices are known in the art that employ positive temperature coefficient thermistors as a fuel vaporization devices.

U.S. Pat. No. 4,651, 702 issued to Nara, Yazawa, and Akiyama on Mar. 24, 1987 and U.S. Pat. No. 4,398,522 issued to Kuroiwa, Kato, and Ando on Aug. 16, 1983 are examples of this technology employed in tubular configurations and located between the carburetor and intake manifold associated with an internal combustion engine. A drawback of this approach is that only fuel that contacts the heating element is vaporized leaving the majority of the fuel that passes by the element unheated. Another drawback is that when the thermistor is located between the carburetor and intake manifold it is necessary to heat a large volume of air in order to heat a small volume of fuel making this approach inefficient.

U.S. Pat. No. 4,387,690 issued to Chivaroli in June of 1983 sets forth a PTC heating element located in the intake manifold of an internal combustion engine for the purpose of fuel vaporization. A deficiency of this configuration is its inefficiency as a fuel vaporizer due to the fact that air must be heated as well as fuel. In addition it is restrictive of air inlet flow.

U.S. Pat. No. 4,356,804 issued to Igashira, Nomura, and Abe on Nov. 2, 1982 sets forth a heated plate beneath a carburetor and suffers from the same inefficiency as does the previous example.

U.S. Pat. No. 4,212,275 issued to Inone on Jul. 15, 1980, sets forth an embodiment consisting of a 3-dimensionally porous positive temperature coefficient thermistor of an annular configuration located in the venturi section of a carburetor so as to become the outside wall of the venturi. The PTC thermistor is subjected to electric current so as to become heated. The PTC thermistor then autostabilizes its temperature at the optimum temperature for vaporizing gasoline that is drawn through it due to engine vacuum. The thermistor element makes electrical contact at its outside diameter with the carburetor body and at its inside diameter with a metal aperture ring perforated with a series of holes. This configuration suffers from deficiencies that would make it impractical for its intended application.

This embodiment will not vaporize all of the fuel drawn through the carburetor. Only a portion of the fuel which actually passes through the pores of the thermistor would be transformed leaving a large percentage of fuel unchanged. There is a question as to whether gasoline having a much higher viscosity than the inlet air with which it is mixed would actually pass through the pores of the element at all. In any case, a large volume of inlet air can be expected to pass through the pores of the element. This phenomena would cause two problems. First it would tend to greatly cool the porous thermistor causing its electrical resistance to become lowered thereby increasing its current flow and decreasing its efficiency as a fuel vaporizer considerably. Secondly contaminants in the inlet air which would be extremely difficult to remove sufficiently even after filtering. Air would pass continuously through the pores of the thermistor element causing it to become clogged in the same manner as an air filter becomes clogged necessitating frequent replacement or cleaning of the porous element.

This embodiment has considerable thermal mass making it sluggish to respond to changes in fuel flow, it also can be expected to have a wicking effect causing engine responsiveness to suffer.

In addition, the porous PTC ceramic is intended to absorb some portion of fuel that flows through the conduit due to engine vacuum where it is to be vaporized and returned to the conduit downstream. It is doubtful that any significant portion of the fuel flow would actually find its way through the holes in the wall of the conduit and into the porous ceramic element. More likely the fuel flow would take the path of least resistance and flow straight through the conduit. Any fuel that did find its way into the porous ceramic element would immediately be vaporized causing an increase in pressure within the ceramic body, thereby tending to prevent additional fuel from entering the ceramic element's pores.

Several vaporizer type fuel injectors are known that utilize electrical heat sources for the purpose of vaporizing fuel supplied by an injector. These devices are intended primarily for self-igniting internal combustion engines whereby fuel is injected directly into the combustion chamber as opposed to into the air inlet system of an engine or furnace as would be the case with the instant invention. Generally, these devices employ electrically heated cylindrical areas or coiled resistance wire located at the tip of the injector nozzle. It is presumed that some of these devices might also be employed as gasoline fuel injectors or oil burner nozzles, however there efficiency would be less than the porous thermistor utilized in the instant invention. The following are some examples of this technology. U.S. Pat. No. 4,760,818 issued to Brook on Aug. 2, 1988, U.S. Pat. No. 4,603,667 issued to Grunwald on Aug. 5, 1986, U.S. Pat. No. 4,627,405 issued to Imhof on Dec. 9, 1986, and U.S. Pat. No. 4,834,043 issued to Kaczynaki on May 30, 1989.

SUMMARY OF THE INVENTION

In accordance with the present invention, a liquid vaporizer and defuser is constructed by combining a liquid injection means and a porous thermistor element of a 3-dimensionally porous ceramic having a positive temperature coefficient of electrical resistance. The porous thermistor is electrically heated in and of itself when subjected to an electric current. The temperature of the porous thermistor becomes autostabilized at or around the optimum temperature for vaporizing the liquid forced into the thermistor by the liquid injection means. The injected liquid vaporizes inside the porous thermistor and expands to a gaseous state whereby it exits the thermistor due to an increase in pressure.

The invention when utilized for the purpose of vaporizing liquid fuel for combustion in an internal combustion engine or furnace eliminates problems of inefficiency and practicality associated with previous fuel vaporizing devices. The instant invention in addition to vaporizing or gasifying fuel will also serve as a fuel diffuser and flame arrestor.

Accordingly, it is an object of the present invention to provide a new and more efficient means of fuel vaporization.

It is a further object of the present invention to provide a fuel vaporizer that will produce vaporized fuel immediately upon starting of the engine or furnace to which it is affixed.

It is another object of this invention to provide a fuel vaporization means that will not restrict air inlet flow.

It is a further object of this invention to provide a means of diffusing fuel while simultaneously gasifying or vaporizing it.

DETAILED DESCRIPTION OF THE INVENTION

Figure 1:
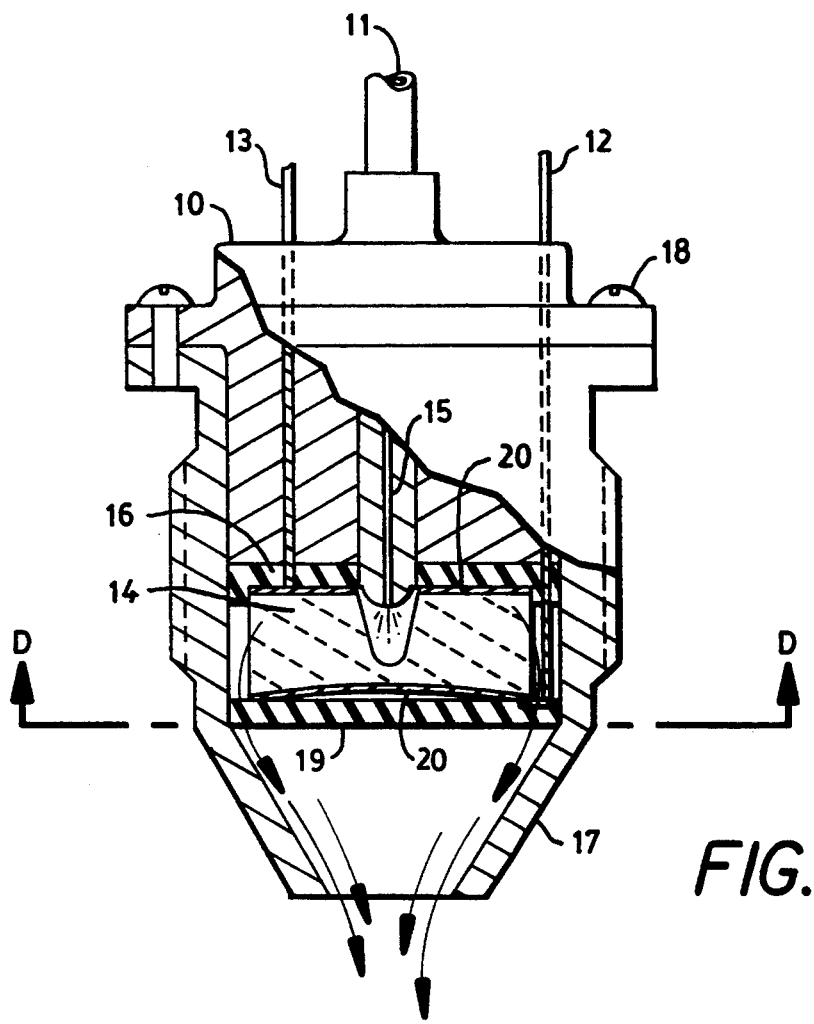
FIG. 1 is a side view shown in partial section of a liquid injection means in combination with a 3-dimensionally porous PTC thermistor, the thermistor is surrounded by a nozzle.

The invention provides a means for the vaporization or gasification of liquids which is simple in form, efficient, dependable and inexpensive to manufacture. The instant invention can be used as a means for gasification of liquid fuel to achieve greater combustion efficiency in an internal combustion engine or furnace. In addition, the same device can be used for non-combustion applications in any process that requires liquid to be vaporized or gasified at a specific point in the application.

To accomplish this, a liquid injection means such as a gasoline fuel injector, liquid atomizer nozzle or ultrasonic nozzle is affixed to an electrically powered heat exchanger. The electrically powered heat exchanger is constructed of a 3-dimensionally porous ceramic having a positive temperature coefficient of electrical resistance called in the art a PTC thermistor. The thermistor is connected to a power source.

PTC thermistors have a unique characteristic that makes them ideally suited for many heating element applications and in particular for the heat exchanger in the instant invention.

PTC thermistors are ceramic semiconductors generally based on the material barium titanate to which small quantities of ions are added to modify the resistance-temperature properties of the device. As the thermistor becomes heated due to the flow of electric current through it, its electrical resistance increases dramatically by several orders of magnitude over a short temperature span increase of for instance 50° to 100° centigrade. This tremendous increase in electrical resistance causes the amperage flow through the element to decrease proportionately whereby the components' temperature will autostabilize consuming just enough power to replace the heat which is lost to the medium being warmed. If the medium to be heated is gasoline and additional gasoline is injected into the porous PTC thermistor, the device will become cooled causing its electrical resistance to lower, thereby allowing more amperage to flow through the device heating it back to its autostabilized temp. Conversely, the opposite is true if the quantity of gasoline injected into the thermistor is decreased whereby the device tends to warm, causing its electrical resistance to increase and the amperage flow through it to decrease. Through this mechanism a properly designed PTC thermistor can maintain itself at a predetermined temperature, ranging from about 10° Centigrade to 204° Centigrade, regardless of the changing quantities of liquid passing through it. If the thermistor is designed to autostabilize at a temperature at which a specific liquid vaporizes or turns to gas it is apparent that this is an ideal means for the purpose intended in the instant invention.

Modern PTC thermistor materials have a great deal of flexibility and can be designed to have a "switching temperature", or temperature at which electrical resistance increases greatly, at a wide range from 0° centigrade to 300° centigrade making these materials very adaptable for use in the instant invention. Additionally, a PTC thermistor that is constructed to be of a 3-dimensionally porous nature is a very efficient heat exchanger in that a liquid injected into it must travel a torturous path through the porous ceramic where it will make a great deal of surface contact through a relatively short distance.

The liquid injection means as in the case of a gasoline fuel injector, is arranged to inject atomized fuel into the porous thermistor, whereupon contacting the hot ceramic the fuel is expanded into a gas. The liquid fuel having gone through the transformation to a gaseous state causes an increase of pressure inside the porous thermistor whereby the gas escapes through the pores of the element. The pore size incorporated in the thermistor design can be varied greatly to suit the application. Several factors influencing pore size are liquid to be gasified or vaporized, quantity of liquid, vaporization temperature, and wattage restraints.

Two important considerations in the design of the porous thermistor are the watt density capabilities of the material and the "electroding" or electrical connection of the thermistor to its power surface.

Generally, the power carrying capabilities of PTC ceramics are considered to be in the range of 50–100 watts per square inch at zero degrees centigrade. The power carrying capability of a thermistor will decrease as increasing levels of porosity are introduced into the ceramic for the heat exchanger of the instant invention. The electrical resistance of the porous thermistor can be made to vary greatly by changes in its size, shape, porosity, composition and electroding. Varying design criteria can be expected to produce thermistor materials having a specific resistivity in the range of about 50 $\Omega$ cm to about 100M $\Omega$ cm. The aforementioned variables can be utilized to good advantage when designing the porous thermistor of the instant invention for specific applications.

A widely used means for electroding PTC thermistors is to metalize two opposing surfaces and then to use these metalized surfaces as a means of electrical connection to the power source. It is necessary to metalize opposing surfaces as opposed to adjacent surfaces so as to get power to flow through the entire component. This metalizing process can be used to great advantage in the construction of the porous thermistor. In addition to electroding the element the metalization process can be made to close the pores of the ceramic component at a desired location or locations forcing the expanding gas to seek an exit from the thermistor at a more advantageous location.

Numerous thermistor shapes and electroding combinations can be employed with various liquid injection means in the instant invention. Cylinders, tapered cylinders and partial hemispheres can be used that are electroded by means of metalized surfaces at the opposing ends of the porous thermistor, thereby allowing current to flow axially through the component.

Hollow cylinders, hollow tapered cylinders, hollow hemispheres and flat discs having a void in the center are other examples of possible thermistor designs. These shapes can be electroded by metalizing the inside surface or the inside of a hole in the center of the part. Through this arrangement current can be made to flow radially through the porous thermistor. As will be obvious to a person skilled in the art, there are many variations of this concept that are still within the spirit of the instant invention.

Location of the porous thermistor relevant to the liquid injection means can be accomplished through numerous methods. Mechanical attachment of the thermistor to the liquid injection device can be accomplished by way of fasteners, adhesives or threading the components together. The liquid injection means and porous thermistor can both be retained in a housing whereby in addition to locating the two components relative to each other the housing can act as a nozzle for exiting gas.

Porous thermistor elements that incorporate a relatively large void area in the center can utilize an impingement deflector extending close to the point at which liquid is injected thereby causing better dispersal of the liquid within the thermistor. In addition to improving liquid dispersal, dead air space within the thermistor can be reduced, thereby improving responsiveness of the device to increases of the liquid injected.

In some applications, it will be desirable to provide electrical or thermal insulation between the porous thermistor, the liquid injection means and, if used the nozzle type cover. Use of insulating material in the instant invention will facilitate the attachment of power supply leads particularly in designs that utilize voltages too high to allow the nozzle cover to be used as one leg of the power circuit. It may be desirable to dispose a thermal insulator between the fuel injector and porous thermistor in an automotive gasoline throttle body fuel injection system in order to avoid overheating gasoline returning to the fuel tank.

The liquid injector porous thermistor combination of the instant invention in addition to vaporizing or gasifying liquid will also disburse the gas efficiently. In addition due to the fact that in a fuel vaporization application the thermistor will be highly saturated with fuel, a porosity size ranging from about 5 microns to about 500 microns, can be chosen that will not permit fuel to burn inside the device causing a flame arrestor effect in the event of an engine backfire.

The aforementioned invention when located in a throttle body or within an intake manifold associated with an internal combustion engine or furnace would improve fuel burning efficiency and reduce exhaust pollutants.

DESCRIPTION OF PREFERRED EMBODIMENTS

Hereinafter, the embodiments of the present invention will be explained in detail with reference to the drawings.

Figure 1A:
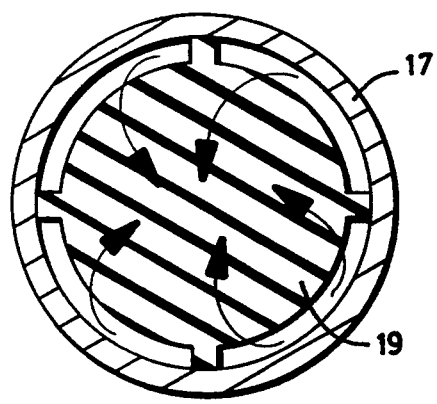
FIG. 1A is a full sectional view taken along a plane indicated by D—D in FIG. 1.

In the first embodiment shown in FIGS. 1 and 1A, a fuel injector body 10 having a fuel inlet tube 11 and electrical power leads 12 and 13 has a 3-dimensionally porous PTC thermistor 14 located coaxially relevant to the point of fuel injection by atomizer 15. Porous thermistor 14 is metalized at two opposing surfaces 20 for the purpose of connecting electrical power leads 12 and 13 which are in turn connected to electrical power source which is not shown. Insulator 16 is provided between porous thermistor 14 and fuel injector body 10. A nozzle cover 17 with a reduced exit hole surrounds thermistor 14 and a portion of fuel injection body 10 where it is secured to fuel injector body 10 by threaded fasteners 18. Insulator 19 is provided between porous thermistor 14 and nozzle cover 17.

In this embodiment electric current flows axially through the porous thermistor heating it. As fuel or any preferably non-electrically conductive liquid is injected into the void in the center of the thermistor, the liquid is vaporized where it expands and diffuses radially through the porous ceramic. The nozzle cover 17 directs the vaporized gas into a common flow.

FIG. 1A illustrates from a bottom view the motion of the fluid vapor as it exits the thermistor 14 into the interior of the nozzle cover 17. The direction of the motion of the fluid vapor is indicated by the arrows.

Figure 2:
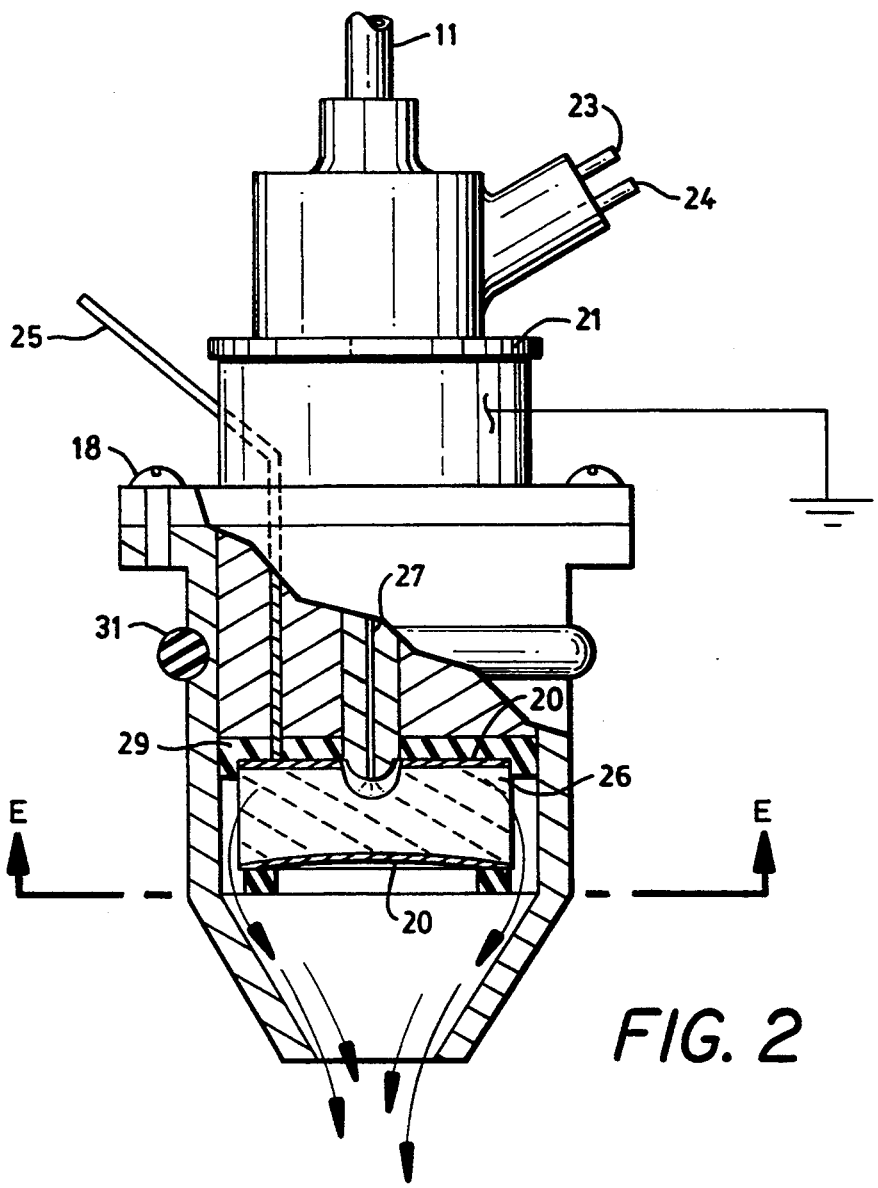
FIG. 2 is a side view shown in partial section of a liquid injection means in combination with a 3-dimensionally porous PTC thermistor, the thermistor is surrounded by a nozzle.
Figure 2A:
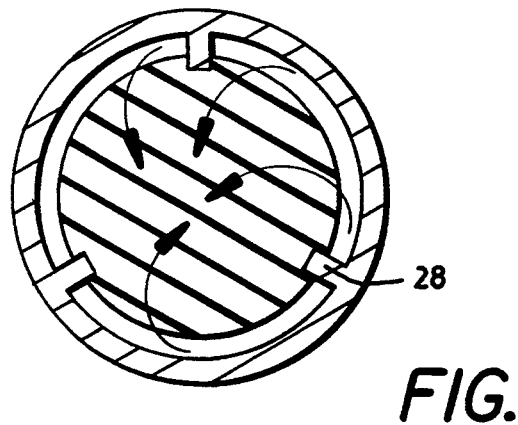
FIG. 2A is a full sectional view taken along a plane indicated by E—E in FIG. 2.

In the second embodiment shown in FIGS. 2 and 2A an electronic fuel injector body 21 having a fuel inlet tube 11, injector control leads 23 and 24 and thermistor lead 25 has a 3-dimensionally porous PTC thermistor 26 located coaxially relevant to the point of fuel injection by atomizer 27. Porous thermistor 26 is metalized at two opposing surfaces 20 for the purpose of connecting thermistor lead 25 at one end and for the purpose of electrically grounding to projections on nozzle cover 28 at its opposing end. Thermistor power lead 25 is connected to electrical power source which is not shown. The grounded fuel injector body 21 constitutes the other leg of the thermistor power circuit. Insulator 29 is provided between porous thermistor 26 and fuel injector body 21. Nozzle cover 28 is secured to fuel injector body 21 by threaded fasteners 18. An "O"-ring 31 is provided to hold fuel injector body 21 into a hole in intake manifold which is not shown. This embodiment has the same mode of operation as the embodiment in FIG. 1 with the exception that the fuel injector body becomes one leg of the electrical circuit for the porous thermistor.

FIG. 2A illustrates from a bottom view the motion of the fluid vapor as it exits the thermistor 26 into the interior of the nozzle cover. The direction of the motion of the fluid vapor is indicated by the arrows.

Figure 3:
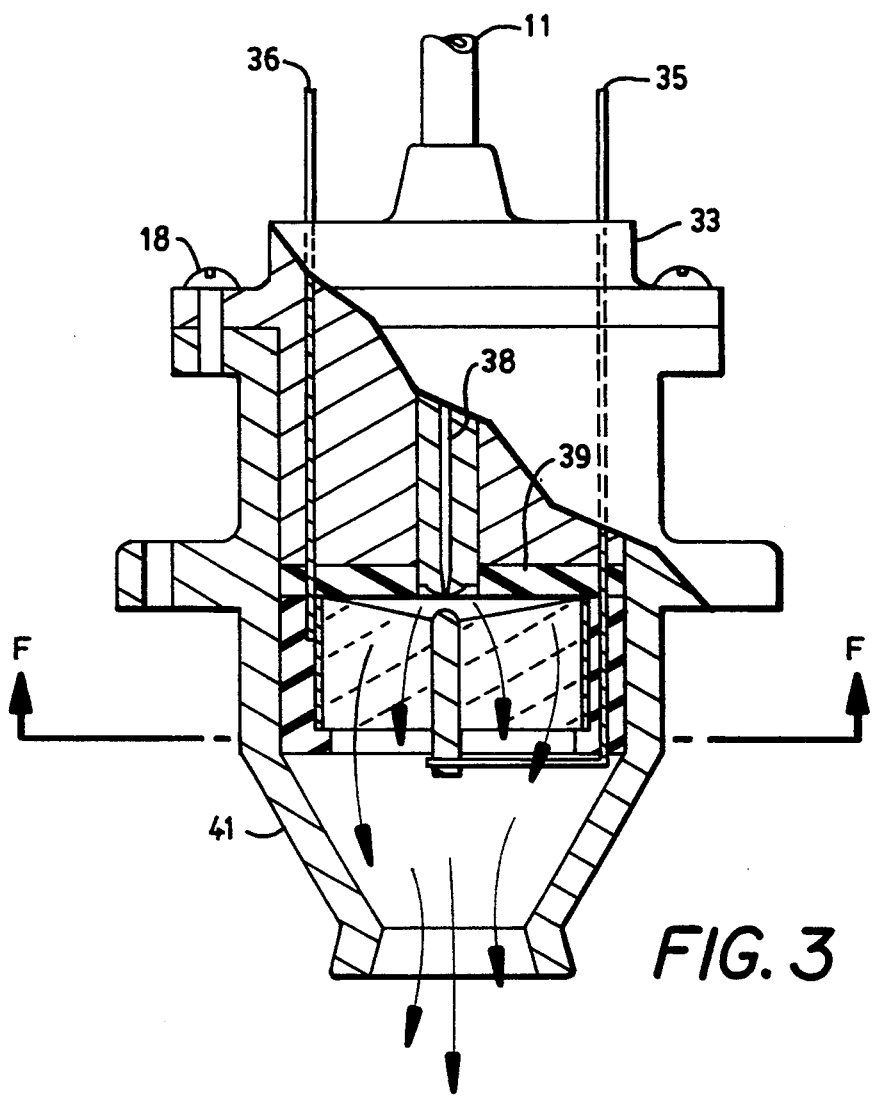
FIG. 3 is a side view shown in partial section of a liquid injection means in combination with a 3-dimensionally porous PTC thermistor, the thermistor is surrounded by a nozzle.
Figure 3A:
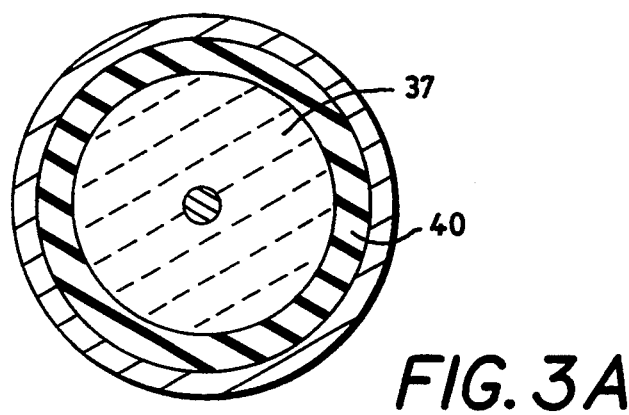
FIG. 3A is a full sectional view taken along a plane indicated by F—F in FIG. 3.

In the third embodiment shown in FIGS. 3 and 3A, a liquid injector having a body 33, a liquid inlet tube 11 and electrical power leads 35 and 36 has a 3-dimensionally porous PTC thermistor 37 located coaxially relevant to the point of liquid injection by atomizer 38. Porous thermistor 37 is metalized at its outside diameter and has a metal filled void in its center which extends sufficiently close to the point of liquid injection where it will act as an impingement deflector. The metalized outside diameter of the thermistor and metal filled void in the center of the thermistor are connected to electrical power leads 35 and 36 which are in turn connected to electrical power source which is not shown. Electrical insulator 39 is provided between porous thermistor 37 and liquid injector body 33. Electrical insulator 40 is provided between porous thermistor 37 and nozzle cover 41 which is secured to liquid injector body 33 by threaded fasteners 18.

In this embodiment, electric current flows radially through the porous thermistor heating it. As fuel or any preferably non-electrically conductive liquid is injected into the void between the porous thermistor and insulator 39, it becomes vaporized and expands upon contact with the hot thermistor and diffuses axially through the porous ceramic. The nozzle cover 41 directs the vaporized gas into a common flow.

Figure 4:
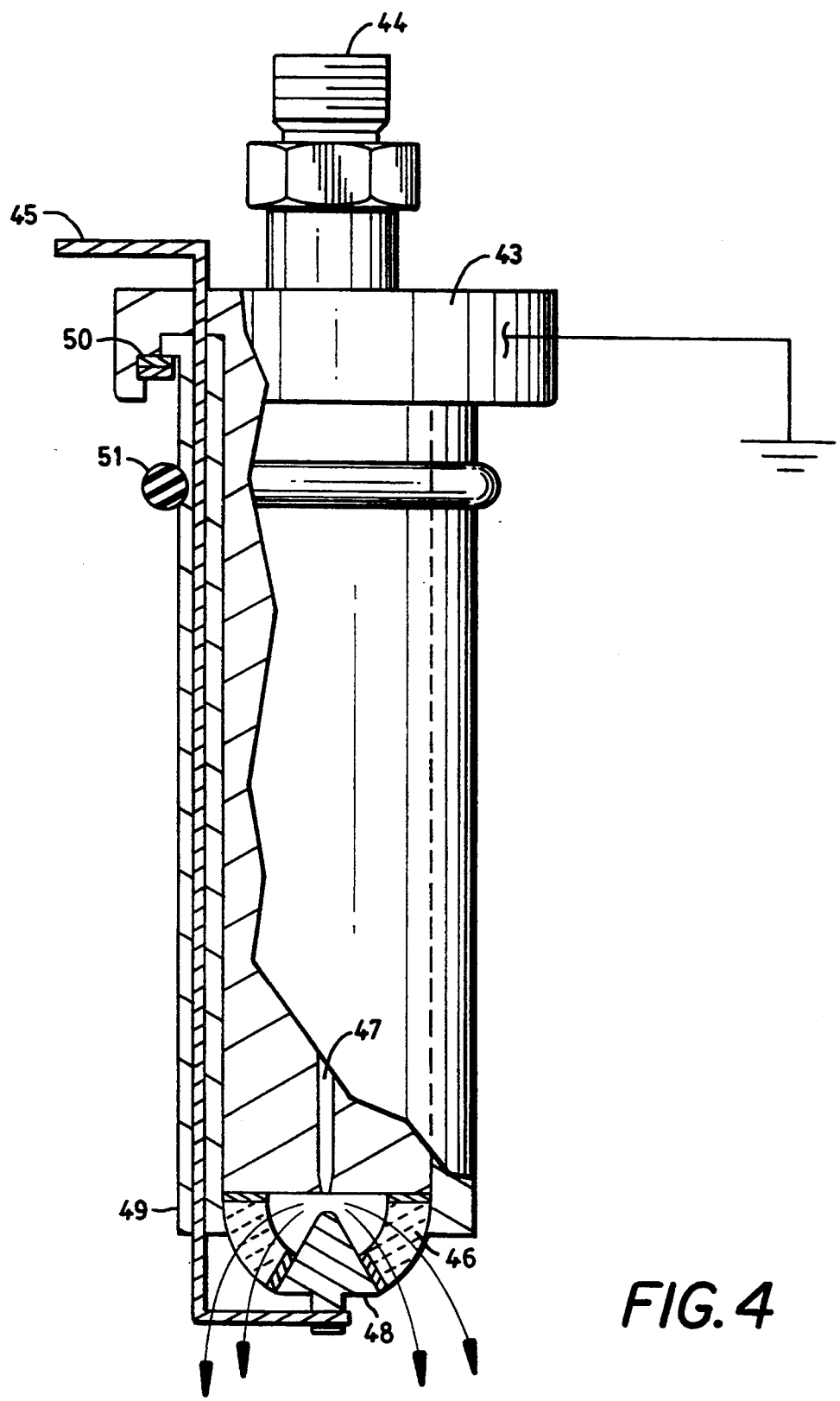
FIG. 4 is a side view shown in partial section of a liquid injection means in combination with a 3-dimensionally porous PTC thermistor.

In the fourth embodiment shown in FIG. 4, a liquid injector with a body 43 having a liquid inlet tube 44 and electrical power lead 45 has a 3-dimensionally porous PTC thermistor 46 located coaxially relevant to the point of liquid injection by atomizer 47. Porous thermistor 46 has a hollow hemispherical shape and is metalized at the annular surface that contacts injector body 43. Porous thermistor 46 has a conical void in its bottom which is metal filled 48 and extends sufficiently close to the atomize orifice so as to act as an impingement deflector. Electrical power lead 45 is connected to metal cone shaped deflector 48. Annular metalized porous thermistor surface makes electrical contact with injector body 43 to complete the electrical circuit to the power source which is not shown. Outer sleeve 49 fits over injector body 43 holding thermistor in place relevant to the means of liquid injection. Retaining ring 50 secures outer sleeve 49 to injector body 43. An "O" ring 51 is provided to hold injector body into a hole in an inlet manifold which is not shown.

In this embodiment electric current flows axially through the porous thermistor heating it. As any preferably non-electrically conductive liquid is injected against the inside spherical surface of the porous thermistor, it becomes vaporized and expands diffusing radially through the porous ceramic.

Figure 5:
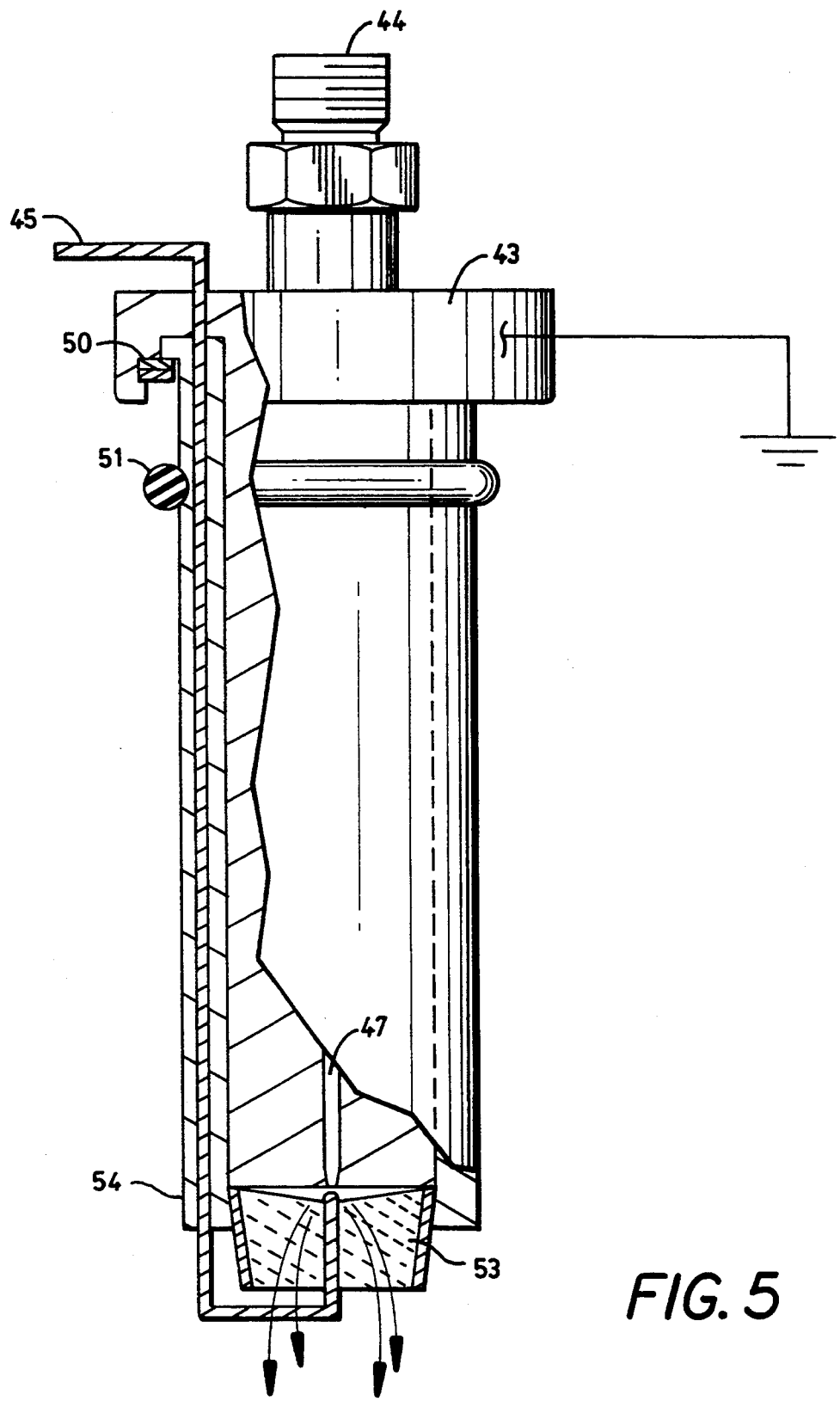
FIG. 5 is a side view shown in partial section of a liquid injection means in combination with a 3-dimensionally porous PTC thermistor.

In the fifth embodiment shown in FIG. 5, a liquid injection means with a body 43 having a liquid inlet tube 44 and electrical power lead 45 has a 3-dimensionally porous PTC thermistor located coaxially relevant to the point of liquid injection by atomizer 47. Porous thermistor 53 has a tapered cylindrical shape with a concave surface facing liquid atomizer 47. The outside diametrical surface of porous thermistor 53 is metalized and when mechanically retained by outer sleeve 54 will become electrically grounded to the liquid injection means constituting one leg of the electrical circuit to the power supply source which is not shown. Retaining ring 50 secures outer sleeve 54 to body 43. Electrical power lead 45 from power source extends through a metalized hole in the center of porous thermistor 53 to a point sufficiently close to the atomizer orifice 47 so as to act as an impingement deflector. "O" ring 51 is provided to secure assembly into intake manifold not shown.

In this embodiment electric current flows radially through the porous thermistor heating it. As any preferably non-electrically conductive liquid is injected against the concave surface of the heated porous thermistor it becomes vaporized and expands diffusing axially through the porous ceramic.

Figure 6:
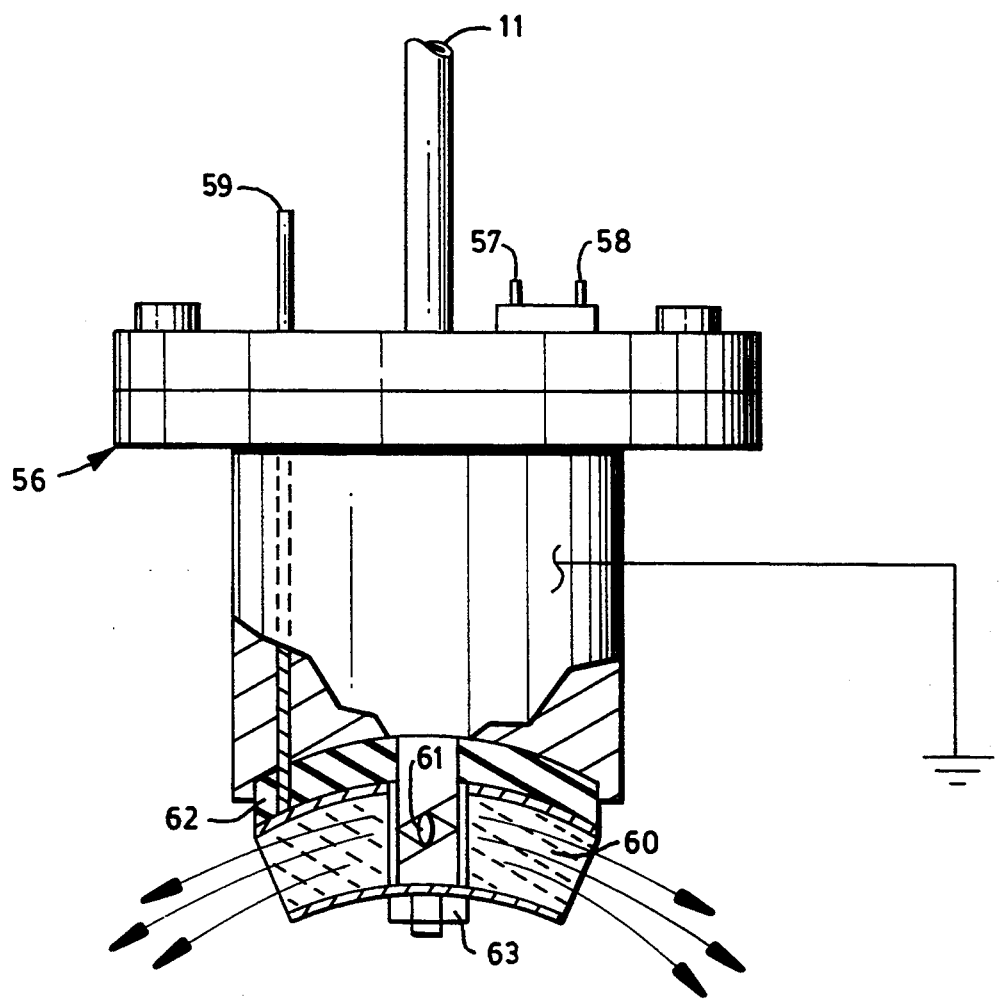
FIG. 6 is a side view shown in partial section of an ultrasonic nozzle in combination with a 3-dimensionally porous PTC thermistor.

In the sixth embodiment shown in FIG. 6, an ultrasonic nozzle assembly 56 having a liquid inlet tube 11 transducer power leads 57 and 58 and thermistor power lead 59 has a convex shaped 3-dimensionally porous PTC thermistor 60 located coaxially relevant to the point of atomized liquid injection by ultrasonic nozzle orifice 61. An insulator 62 is provided between ultrasonic nozzle assembly 56 and porous thermistor 60. Lock nut 63 holds porous thermistor 60 and insulator 62 in place relevant to the point of liquid injection by ultrasonic nozzle orifice 61. Porous thermistor 60 is metalized at the convex surface adjacent to insulator 62 and also metalized at the opposing concave surface which becomes grounded by contact with lock nut 63 providing one leg of the power circuit for the porous thermistor 60. The remaining leg of the thermistor power circuit is through thermistor lead 59 which is connected to power source which is not shown.

In this embodiment electric current flows axially through the porous thermistor heating it. Ultrasonic nozzle assembly 56 injects atomized liquid into the cylindrical void in the center of porous thermistor 60. As atomized liquid contacts the heated thermistor it vaporizes and expands whereupon the vaporized gas diffuses radially through the porous thermistor due to an increase of pressure within the component.

In this embodiment as in the five previous examples, it will be apparent to a person skilled in the art that there are many configurations possible utilizing porous thermistors in combination with liquid injection devices that are still within the spirit of the present invention. It is not the intention of the inventor to limit the scope of the instant invention to the details set forth in the previous examples. The efficiency of the instant invention can be further improved by locating the device within a venturi area of an intake pipe thereby producing a reduced pressure at or near the point at which gas exits the porous thermistor or nozzle cover exit hole.

Figure 7:
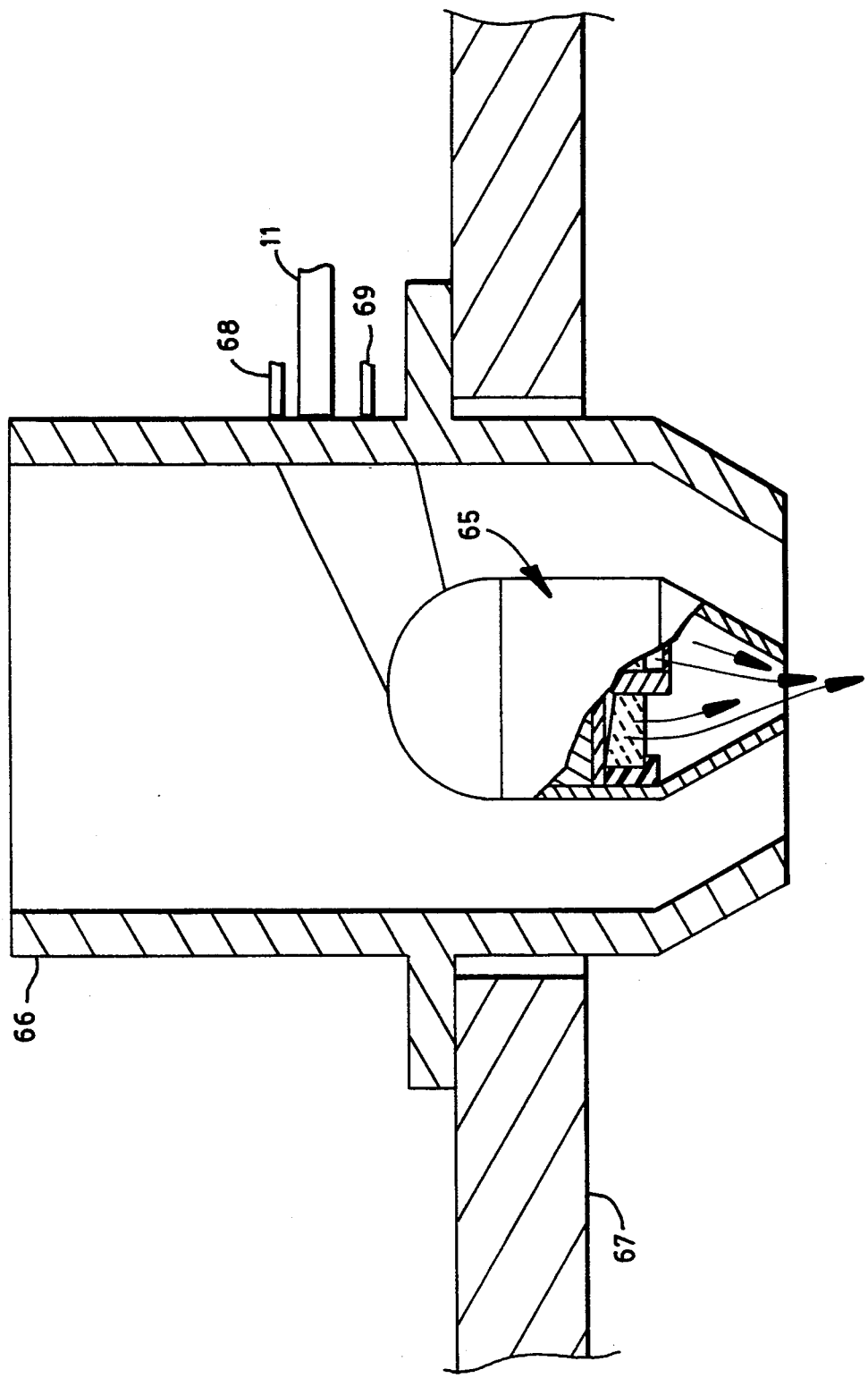
FIG. 7 is a sectional view of an oil burner head (air blower is not shown) a fuel atomizer 3-dimensionally porous thermistor combination is surrounded by a nozzle type cover and located in the center of the burner pipe.

In FIG. 7 a liquid vaporizer and diffuser 65 is located within a burner inlet pipe 66. Burner inlet pipe 66 is secured to burner combustion chamber wall 67. Liquid fuel is supplied through fuel inlet tube 11. Electrical power is supplied to the porous thermistor through power leads 68 and 69.

In this application the liquid vaporizer and diffuser supplies vaporized liquid fuel to a burner for improved combustion efficiency.

Figure 8:
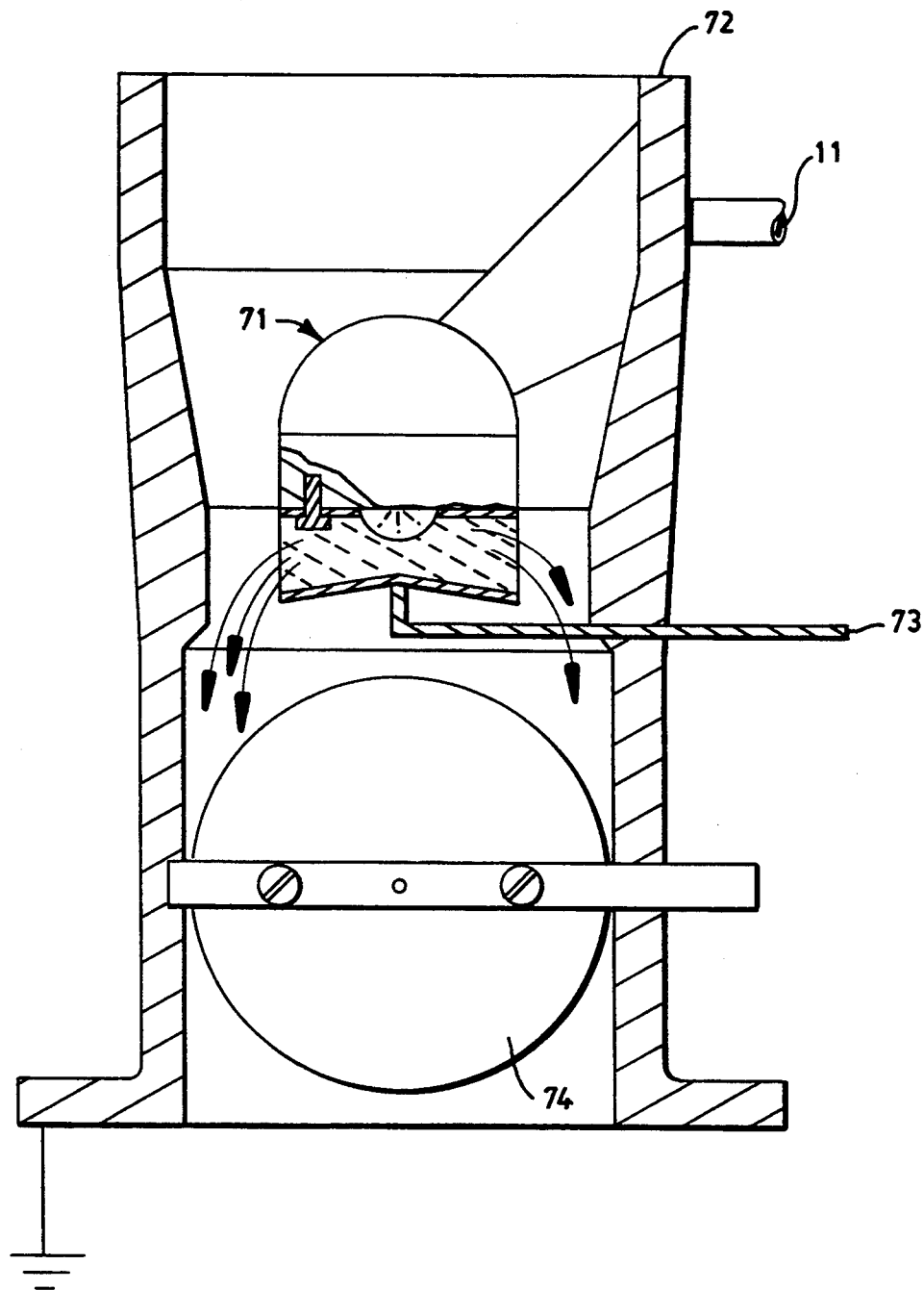
FIG. 8 is a side view shown in section of a throttle body associated with an internal combustion engine, a fuel injector 3-dimensionally porous thermistor combination is located in the center of the throttle body venturi.

In FIG. 8 a liquid vaporizer and diffuser 71 is located within the venturi section of a throttle body housing 72. Electric power to heat the porous thermistor is supplied through power lead 73 and through grounded throttle body housing. An air inlet valve 74 is provided in throttle body throat. Liquid fuel is supplied to fuel nozzle through fuel inlet tube 11.

In this application the liquid vaporizer and diffuser supplies vaporized liquid fuel to an internal combustion engine for improved combustion efficiency.

In still another embodiment, the device of the instant invention is also used for coating, heating, fogging, disbursing and humidifying any liquid especially non-electrically conductive liquids such as, but not limited to, insecticides, germicides, and manufacturing process chemicals.

What is claimed is:

1. A liquid vaporizer and diffuser comprising:
   a housing having a hollow interior;
   liquid injection means for introducing a liquid into the hollow interior of the housing;
   a porous thermistor element affixed at least partially within the hollow interior of the housing and having a void aligned with a point of liquid injection for disbursing the liquid from said liquid injection means within said thermistor element, said porous thermistor element being fabricated from a 3-dimensionally porous ceramic material having a positive temperature coefficient of electrical resistance such that said porous thermistor element is (a) of sufficient electrical resistance to become heated when subjected to an electric current so as to vaporize said incident upon said porous thermistor element; (b) sufficiently porous and thick to allow said vapor to pass through said porous thermistor element when subjected to a pressure differential; (c) sufficiently porous and thick to diffuse vapor passing through said porous thermistor element; and (d) adapted to accept an electrical connection to a power.

2. The liquid vaporizer and diffuser of claim 1 wherein said porous thermistor element has at least two opposing surfaces which are at least partially metalized to provide electrical contacts for generating said electric current.

3. The liquid vaporizer and diffuser of claim 1 wherein said porous thermistor element has a metalized outer surface to provide an electrical contact and metallic area in a center of the porous thermistor element to provide a second electrical contact for generating said electric current.

4. The liquid vaporizer and diffuser of claim 3 wherein said metallic area in the center of said porous thermistor element extends axially toward said liquid injection means so as to act as an impingement deflector.

5. The liquid vaporizer and diffuser of claim 1 wherein said porous thermistor element incorporates a concave surface at either end relative to a common axial center line with said liquid injection means.

6. The liquid vaporizer and diffuser of claim 1 further comprising insulation means secured to said housing between said porous thermistor element and said liquid injection means for providing thermal and electrical insulation.

7. The liquid vaporizer and diffuser as in claim 1 wherein said porous thermistor element is enclosed by a nozzle cover with a reduced diameter exit hole so as to direct exiting gas.

8. The liquid vaporizer and diffuser as in claim 7 wherein insulation is provided between said porous thermistor element, said liquid injection means and said nozzle cover.

9. The liquid vaporizer and diffuser as in claim 1 wherein said porous thermistor element is made of a semiconducting material having a 3-dimensional porosity ranging between 5 microns to 500 microns.

10. The liquid vaporizer and diffuser as in claim 1 wherein said porous thermistor element maintains a temperature between 10° Centigrade and 204° Centigrade.

11. An apparatus for vaporizing and diffusing liquid comprising
a body having a top portion, a bottom portion and lateral sides extending therebetween and having a bore extending therethrough;
fluid injection means entering the bore at the top portion of the body, such that the top portion becomes closed to inhibit air intake, said fluid injection means for introducing fluid into the bore along a fluid injection axis; and
porous thermistor means at least partially enclosed within said body having a curved surface relative to the fluid injection axis, said porous thermistor means for receiving the fluid introduced into the bore by the fluid injection means such that the fluid is forced through the porous thermistor means and is heated by the porous thermistor means such that a fluid vapor is produced in the bore at the bottom portion.

12. An apparatus according to claim 11 wherein said porous thermistor means is fabricated to be a 3-dimensionally porous ceramic material having a positive temperature coefficient of electrical resistance and has two opposed metalized surfaces adapted to receive electrical power.

13. An apparatus according to claim 12 wherein said porous thermistor means further comprises means for autostabilizing temperature such that temperature fluctuations within the porous thermistor means cause the electrical resistance to fluctuate proportionally such that current through the porous thermistor means is changed to alter the temperature in the porous thermistor means in a direction opposing the temperature fluctuations.

14. An apparatus according to claim 11 wherein said apparatus further comprises an impingement deflector located in the path of the fluid from the fluid injection means such that the fluid is dispersed over a surface of the porous thermistor means.

15. An apparatus according to claim 11 wherein said porous thermistor means is aligned with a point of liquid injection for disbursing injected liquid within said thermistor.

16. An apparatus according to claim 11 wherein said curved surface of said porous thermistor means is concave relative to said fluid injection axis.

17. An apparatus according to claim 11 wherein said curved surface of said porous thermistor means is convex relative to said fluid injection axis.

18. An apparatus according to claim 11 wherein said curved surface of said porous thermistor means is conical relative to said fluid injection axis.

19. An apparatus according to claim 11 wherein said curved surface of said porous thermistor means is hemispherical relative to said fluid injection axis.

20. A fluid vaporizer for use with a fluid injection system, said fluid vaporizer comprising
a housing having a central axis and being closed at a top portion and open at a bottom portion, said housing having a bore along the central axis terminating with an aperture in the bottom portion of the housing;
fluid injection means connected to the bore in the housing at the top portion of the housing for introducing fluid into the housing;
deflector means in a path of the fluid for dispersing the fluid;
heating means disposed within the bore for receiving the fluid from the bore and for heating the fluid such that the fluid is transformed into a fluid vapor, said heating means automatically altering electrical resistance to change current flow such that a predetermined temperature of the porous thermistor is maintained, said heating means then
diffusing said fluid vapor and propelling said fluid vapor out of the bottom portion of the housing.

21. The fluid vaporizer according to claim 20 wherein said heating means comprises a porous thermistor having opposed electrical contacts such that current flow between the electrical contacts causes a uniform change in electrical resistance of the porous thermistor.

22. The fluid vaporizer of claim 20 wherein said heating means incorporates a curved surface at either end relative to a common axial center line with said liquid injection means.

23. The fluid vaporizer of claim 20 further comprising insulation means secured to said housing between said heating means and said fluid injection means for providing thermal and electrical insulation.

24. The fluid vaporizer as in claim 20 wherein said heating means is enclosed by a nozzle cover with a reduced diameter exit hole so as to direct exiting gas.

25. The fluid vaporizer as in claim 24 wherein insulation is provided between said heating means, said fluid injection means and said nozzle cover.

* * * * *